(12) United States Patent
Joly et al.

(10) Patent No.: US 11,346,233 B2
(45) Date of Patent: May 31, 2022

(54) DAMPING DEVICE (71) Applicant: SAFRAN AIRCRAFT ENGINES, Paris (FR)

(72) Inventors: Philippe Gérard Edmond Joly, Moissy-Cramayel (FR); François Jean Comin, Moissy-Cramayel (FR); Charles Jean-Pierre Douguet, Moissy-Cramayel (FR); Laurent Jablonski, Moissy-Cramayel (FR); Romain Nicolas Lagarde, Moissy-Cramayel (FR); Jean Marc Claude Perrollaz, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 87 days.

(21) Appl. No.: 16/954,007

(22) PCT Filed: Dec. 14, 2018

(86) PCT No.: PCT/FR2018/053302
§ 371 (c)(1),
(2) Date: Jun. 15, 2020

(87) PCT Pub. No.: WO2019/115977
PCT Pub. Date: Jun. 20, 2019

(65) Prior Publication Data
US 2021/0079794 A1    Mar. 18, 2021

(30) Foreign Application Priority Data
Dec. 14, 2017   (FR) ...................................... 1762170

(51) Int. Cl.
*F01D 5/22* (2006.01)
*F01D 5/26* (2006.01)
(Continued)

(52) U.S. Cl.
CPC ................. *F01D 5/22* (2013.01); *F01D 5/26* (2013.01); *F01D 5/10* (2013.01); *F04D 29/322* (2013.01);
(Continued)

(58) Field of Classification Search
CPC ..... F01D 5/10; F01D 5/22; F01D 5/26; F01D 25/06; F05D 2220/36; F05D 2230/90; F05D 2240/80; F05D 2260/96
See application file for complete search history.

(56) References Cited

U.S. PATENT DOCUMENTS 4,723,889 A * 2/1988 Charreron ................. F01D 5/22
                                                416/193 A
5,205,713 A * 4/1993 Szpunar .................... F01D 5/26
                                                416/193 A
(Continued)

FOREIGN PATENT DOCUMENTS

| CN | 204941612 U | * | 1/2016 |
| FR | 2 345 605 A1 | | 10/1977 |
| FR | 2 988 427 A1 | | 9/2013 |

OTHER PUBLICATIONS

Search Report dated Jul. 31, 2018 by the French Patent Office in application No. 1762170.
(Continued)

*Primary Examiner* — Brian P Wolcott
(74) *Attorney, Agent, or Firm* — Sughrue Mion, PLLC (57) ABSTRACT

The invention relates to a turbomachine assembly (1) comprising:
a first rotor module (2) comprising a first blade (20),
a second rotor module (3), connected to the first rotor module (2), and comprising a second blade of smaller length than the first blade (20), and
a damping device (4) comprising a first radial external surfaces (41) supported with friction against the first
(Continued)

module (2), as well as a second radial external surface (42) supported with friction against the second module (3), so as to couple the modules (2, 3) for the purpose of damping their respective vibrational movements during operation.

18 Claims, 8 Drawing Sheets

(51) Int. Cl.
  *F01D 5/10*  (2006.01)
  *F04D 29/32*  (2006.01)
(52) U.S. Cl.
  CPC ...... *F05D 2220/36* (2013.01); *F05D 2230/90* (2013.01); *F05D 2240/80* (2013.01); *F05D 2260/96* (2013.01)

(56) References Cited

U.S. PATENT DOCUMENTS

| | | | | |
|---|---|---|---|---|
| 5,573,375 A | * | 11/1996 | Barcza | F01D 5/22 416/193 A |
| 5,820,346 A | * | 10/1998 | Young | F01D 5/22 416/193 A |
| 8,911,210 B2 | * | 12/2014 | Bilz | F01D 5/326 416/193 A |
| 10,927,683 B2 | * | 2/2021 | Joly | F01D 25/06 |

OTHER PUBLICATIONS

International Search Report of PCT/FR2018/053302 dated Mar. 28, 2019 [PCT/ISA/210].

Written Opinion of PCT/FR2018/053302 dated Mar. 28, 2019 [PCT/ISA/237].

\* cited by examiner

DAMPING DEVICE

CROSS REFERENCE TO RELATED APPLICATIONS

This application is a National Stage of International Application No. PCT/FR2018/053302 filed Dec. 14, 2018, claiming priority based on French Patent Application No. 17 62170 filed Dec. 14, 2017, the entire contents of each of which are herein incorporated by reference in their entireties.

TECHNICAL FIELD

The invention relates to an assembly comprising a turbomachine rotor module.

The invention relates more specifically to an assembly for a turbomachine comprising two rotor modules and a damping device.

PRIOR ART

A turbomachine rotor module generally comprises one or more stage(s), each stage comprising a disk centered on a turbomachine longitudinal axis, corresponding to the axis of rotation of the rotor module. The rotation of the disk is generally ensured by a rotating shaft to which it is integrally connected, for example by means of a rotor module trunnion, the rotating shaft extending along the turbomachine longitudinal axis. Blades are mounted on the external periphery of the disk, and distributed circumferentially in a regular manner around the longitudinal axis. Each blade extends from the disk, and also comprises an airfoil, a platform, a support and a root. The root is embedded in a recess of the disk configured for this purpose, the airfoil is swept by a flow passing through the turbomachine and the platform forms a portion of the internal surface of the flow path.

The range of operation of a rotor module is limited, in particular due to aeroelastic phenomena. The rotor modules of modern turbomachines, which have a high aerodynamic loading and a reduced number of blades, are more sensitive to this type of phenomena. In particular, they have reduced margins between the operating zones without instability and the unstable zones. It is nevertheless imperative to guarantee a sufficient margin between the stability range and that of instability, or to demonstrate that the rotor module can operate in the unstable zone without exceeding its endurance limit. This allows guaranteeing risk-free operation over its entire life and the entire range of operation of the turbomachine.

Operation in the zone of instability is characterized by coupling between the fluid and the structure, the fluid applying the energy to the structure, and the structure responding with its natural modes at levels which can exceed the endurance limit of the material constituting the blade. This generates vibrational instabilities which accelerate the wear of the rotor module and reduce its lifetime.

In order to limit these phenomena, it is known to implement a system damping the dynamic response of the blade, so as to guarantee that it does not exceed the endurance limit of the material, regardless of the operating point of the rotor module. However, most of the known systems of the prior art are dedicated to dampen vibration modes with non-zero dephasing, and characterizing an asynchronous response of the blades to aerodynamic forces. Such systems have for example been described in documents FR 2 949 142, EP 1 985 810 and FR 2 923 557, in the Applicant's name. These systems are all configured to be accommodated between the platform and the root of each blade, in the recess delimited by the respective supports of two successive blades. Moreover, such systems operate, when two successive blade platforms are moved with respect to one another, by dissipating the vibration energy, by friction for example.

However, these systems are completely ineffective for damping vibration modes having a zero-dephasing involving the blades and the rotor line, i.e. its rotating shaft. Such modes are characterized by a flexure of the rotor blades with zero inter-blade dephasing implying a non-zero moment on the rotating shaft. In addition, this is a coupled mode between the blade, the disk and the rotating shaft. More precisely, the torsion within the rotor module, resulting for example from reverse forces between a turbine rotor and a compressor rotor, lead to flexural movements of the blades with respect to their attachment to the disk. These movements are greater the longer the blade, and the more the attachment is flexible.

Thus, there exists a need for a damping system for a turbomachine rotor making it possible to limit the instabilities generated by all modes of vibration as previously described.

SUMMARY OF THE INVENTION

One goal of the invention is to dampen vibration modes having zero dephasing for all types of turbomachine rotor modules.

Another goal of the invention is to influence the damping of vibration modes with non-zero dephasing, for all types of turbomachine rotor modules.

Another goal of the invention is to propose a damping solution that is simple and easy to implement.

The invention proposes in particular a turbomachine assembly comprising:
 a first rotor module comprising a first blade,
 a second rotor module, connected to the first rotor module, and comprising a second blade of smaller length than the first blade, and
 a damping device comprising a first radial external surface supported with friction against the first module,
as well as a second radial external surface supported with friction against the second module, so as to couple the modules for the purpose of damping their respective vibrational movements during operation.

The mechanical coupling between the first and the second rotor module allows increasing the tangential stiffness of the connection between these two rotors, while still allowing a certain axial and radial flexibility of the damping device so as to maximize contact between the different elements of the assembly. This makes it possible to limit the instabilities related to the vibration mode with zero dephasing, but also to participate in the damping of vibration modes with non-zero dephasing. In addition, such an assembly has the advantage of an easy integration within existing turbomachines, whether during manufacture or during maintenance.

The assembly according to the invention can also comprise the following features, taken alone or in combination:
 the first rotor module comprises a disk centered on a turbomachine longitudinal axis, the first blade being mounted on the external periphery of the disk from which it extends, and also comprising an airfoil, a platform, a support and a root embedded in the recess of the disk, and the second module comprises a ferrule comprising a circumferential extension extending toward the platform of the first blade, the first radial external surface of the damping device being supported with friction on an internal surface of the platform of the first blade, the second radial external surface of the damping device being supported against the circumferential extension of the ferrule of the second rotor module, the damping device comprises a first sacrificial plate housed at the first and at the second radial external surface, the first plate being configured to guarantee the support of said radial external surfaces, the first plate comprises a coating configured to reduce friction between said plate and the rotor modules, the coating comprising a material selected among Teflon and Vespel, the first plate comprises a coating of the viscoelastic type, the damping device comprises bores configured to lighten the mass of the damping device, the damping device comprises inserts, of the metallic type for example, configured to add weight to the damping device, the damping device comprises two shoulders on either side of a notch provided at the internal surface of the damping device, the shoulders being supported against the ferrule, the shoulders are supported against the support, the shoulders are supported against the support and also extend on either side of the support in a circumferential direction, it also comprises an attachment tab connected on the one hand to the damping device, and on the other hand to the connected between the first and the second rotor module, so as to provide anti-rotation, as well as the axial and radial retention of the damping device, the attachment tab comprises a second sacrificial plate housed at the external surface of the attachment tab, the second plate being configured to increase the tangential stiffness of the damping device, the attachment tab is connected to the damping device at the notch, the notch comprises a third sacrificial plate on which the attachment plate is supported, and the first module is a fan, and the second module is a compressor, for example a low-pressure compressor.

The invention also relates to a turbomachine comprising an assembly as previously described.

The invention also relates to a damping device comprising a first radial external surface and a second radial external surface each configured to be respectively supported with friction against a first module and a second module of an assembly as previously described, so as to couple the modules for the purpose of damping their respective vibrational movements during operation.

Finally, the invention relates to a damping system comprising a damping device as previously described, and an attachment tab connected on the one hand to the damping device, and on the other hand to the connection between the first and the second rotor module of an assembly as previously described, so as to provide anti-rotation, as well as the axial and radial retention of the damping device.

RAPID DESCRIPTION OF THE FIGURES

Other features, goals and advantages of the present invention will appear upon reading the detailed description that follows and with reference to the appended drawings given by way of non-limiting examples and in which.

DETAILED DESCRIPTION OF THE INVENTION

An exemplary embodiment of an assembly 1 according to the invention will now be described, with reference to the figures.

Hereafter, upstream and downstream are defined with respect to the normal flow direction of air through the turbomachine. Furthermore, a turbomachine longitudinal axis X-X is defined. In this manner, the axial direction corresponds to the direction of the turbomachine longitudinal axis X-X, a radial direction is a direction which is perpendicular to this turbomachine longitudinal axis X-X and which passes through said turbomachine longitudinal axis X-X, and a circumferential direction corresponds to the direction of a closed planar curve, of which all points are located at equal distance from the turbomachine longitudinal axis X-X. Finally, and unless the contrary is stated, the terms "internal (or interior)" and "external (or exterior)" respectively, are used with reference to a radial direction so that the internal (i.e. radially internal) portion or face of an element is closer to the turbomachine longitudinal axis X-X than the external (i.e. radially external) portion or face of the same element.

Figure 1:
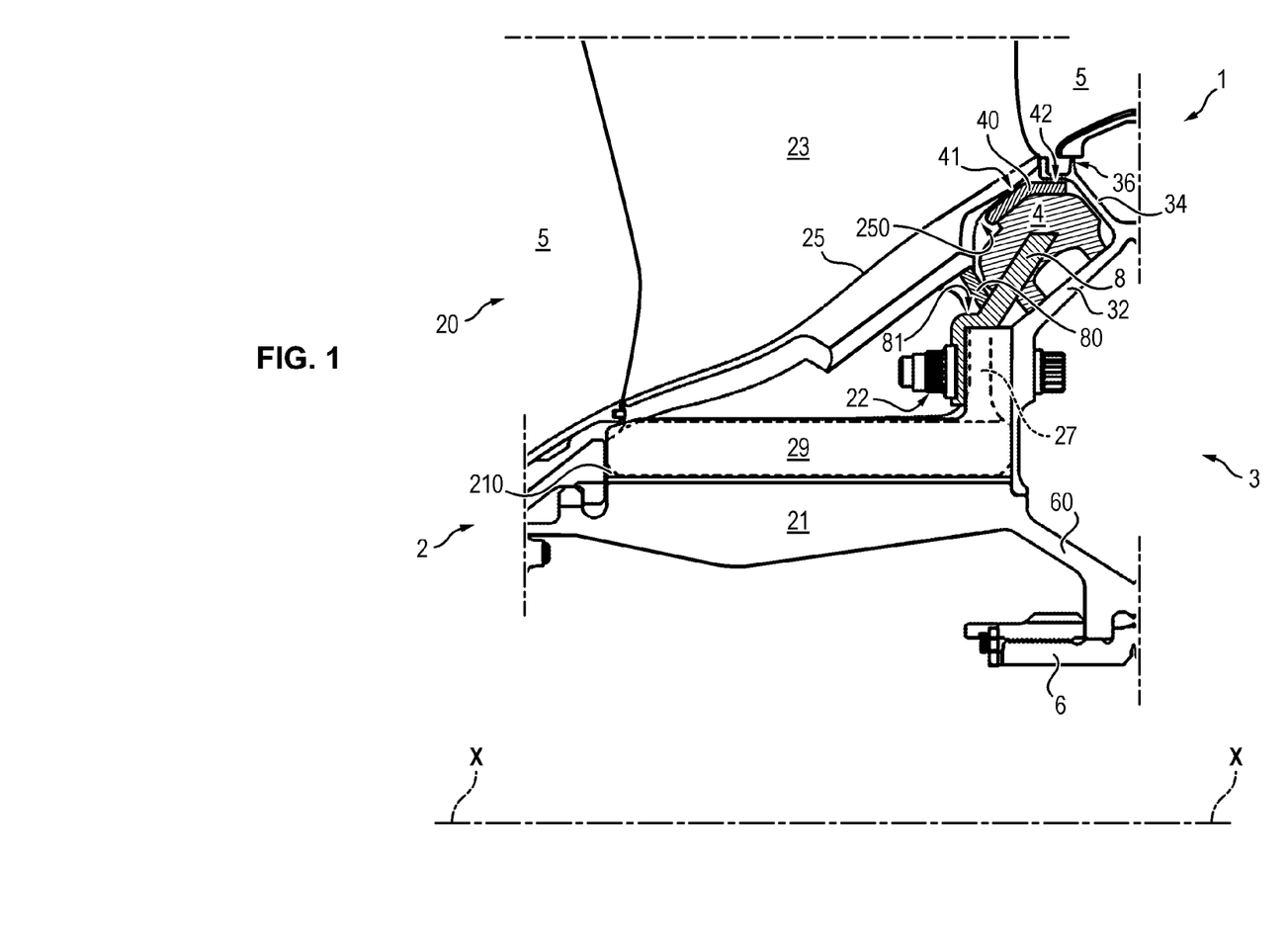
FIG. 1 is a schematic section view of an exemplary embodiment of the assembly according to the invention.
Figure 3A:
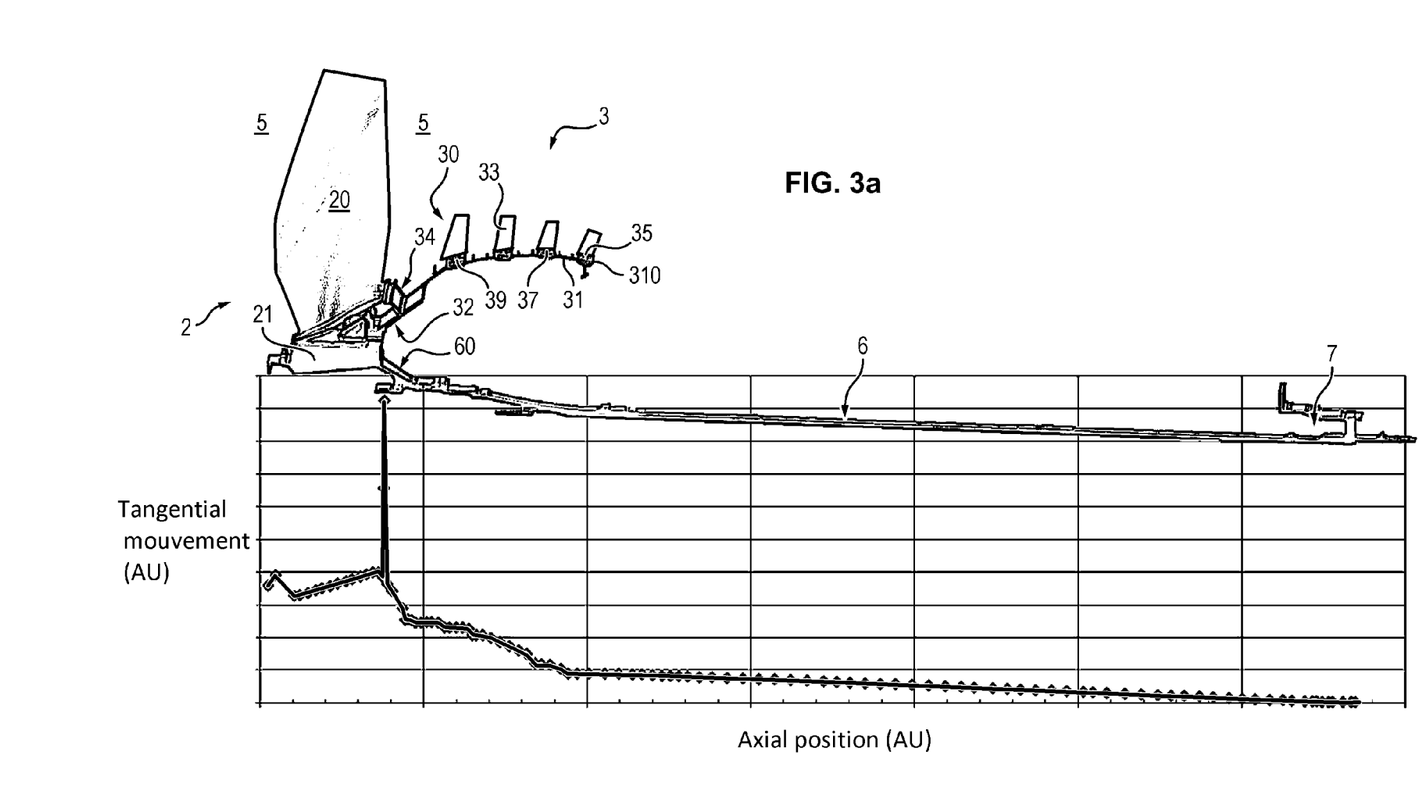
FIG. 3a illustrates schematically tangential movements of the turbomachine rotor modules, as a function of the position of said modules along a turbomachine axis.
Figure 5A:
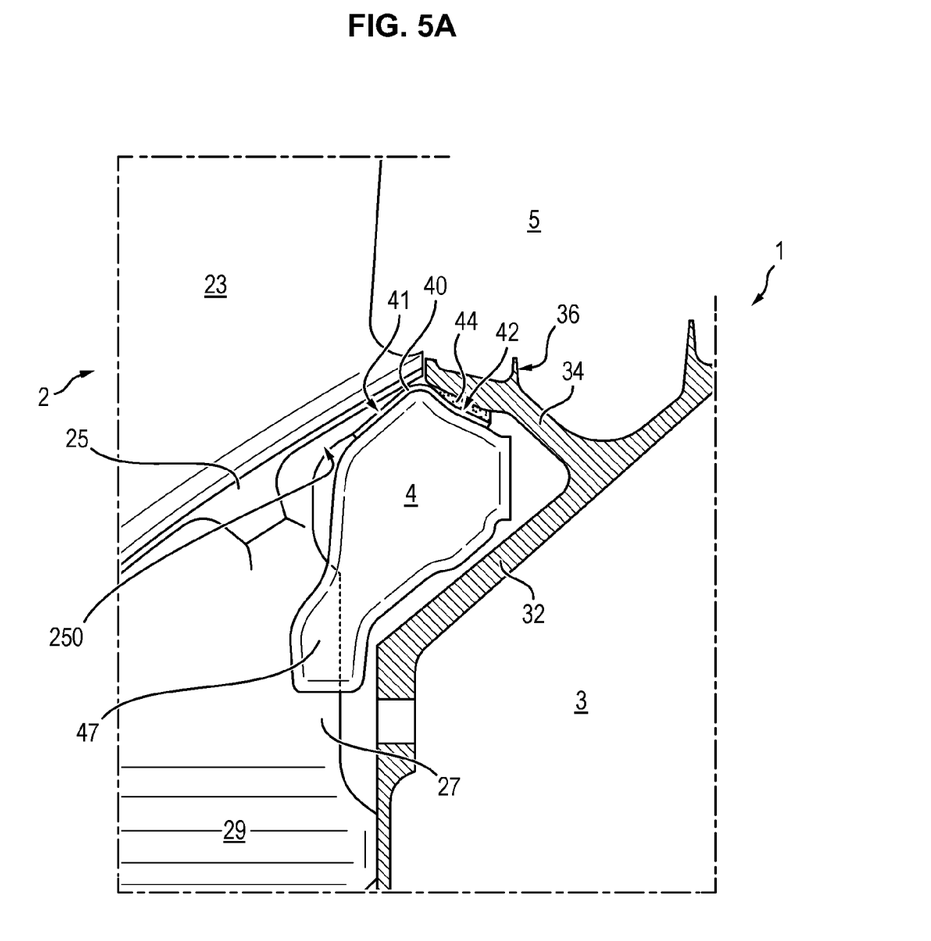
FIG. 5a illustrates schematically a fourth exemplary embodiment of a damping device according to the invention.

Referring to FIGS. 1, 3a, and 5a such an assembly 1 comprises:

a first rotor module 2 comprising a first blade 20, a second rotor module 3, connected to the first rotor module 2, and comprising a second blade 30 with a length smaller than the first blade 20, and a damping device 4 comprising:

a first radial external surface 41, supported with friction against the first module 2, as well as a second radial external surface 42 supported with friction against the second module 3, so as to couple the modules 2, 3 for the purpose of damping their respective vibrational movements during operation.

By support "with friction" is meant that the contact between the radial external surfaces 41, 42 and, respectively, the first rotor module 2 and the second rotor module 3 occurs with friction. In other words, the support forces between the radial external surfaces 41, 42 and, respectively, the first rotor module 2 and the second rotor module 3 can be decomposed into pressure forces which are directed normal to the contact, and friction forces, directed tangentially to the contact. This support guarantees both the mechanical consistency of the assembly 1, by means of the pressure forces, but also the coupling between the modules 2, 3 for the purpose of damping their respective vibrational movements during operation, by means of the friction forces.

In addition, as can be seen in FIGS. 1, 3*a* and 5*a*, the first radial external surface 41 extends along a plane substantially parallel to the plane in which the second radially external surface 42 extends. In other words, these two planes are inclined relative to one another at an angle close to 180°, for example comprised between 165° and 195°.

Referring to FIGS. 1, 3*a*, and 5*a*, the first rotor module is a fan 2, and the second rotor module is a low-pressure compressor 3, situated immediately downstream of the fan 2.

The fan 2 and the low-pressure compressor 3 comprise a disk 21, 31 centered on the turbomachine longitudinal axis X-X, the first 20 and the second 30 blade being respectively mounted on the external periphery of the disk 21, 31 and also comprising an airfoil 23, 33, a platform 25, 35, a support 27, 37 and a root 29, 39 embedded in a recess 210, 310 of the disk 21, 31. The distance separating the root 29, 39 from the end of the airfoil 23, 33 constitutes the respective lengths of the first 20 and of the second 30 blade. The length of the first blade 20 and second blade 30 is therefore considered here to be substantially radial with respect to the longitudinal axis X-X of rotation of the rotor modules 2, 3. In operation, the blade 23, 33 is swept by a flow 5 passing through the turbomachine, and the platform 25, 35 forms a portion of the internal surface of the flow path 5. Generally, as can be seen in FIGS. 2, 3*a*, 5*a* and 5*b*, the fan 2 and the low-pressure compressor 3 comprise a plurality of blades 20, 30 distributed circumferentially around the longitudinal axis X-X. The low-pressure compressor 3 also comprises an annular ferrule 32 also centered on the longitudinal axis X-X. The ferrule 32 comprises a circumferential extension 34, also annular, extending toward the platform 25 of the first blade 20. This annular extension 34 carries radial knife edge seals 36 configured to prevent air flow rate losses from the flow path 5. Moreover, the ferrule 32 is attached to the disk 21 of the fan 2 by means of attachments 22 distributed circumferentially around the longitudinal axis X-X. Such attachments can for example be bolted connections 22. Alternatively, such attachments 22 can be achieved by an interference fit to which is associated an anti-rotation device and/or an axial locking system. Finally, with reference to FIG. 3*a*, the assembly formed from the fan 2 and the compressor 3 is rotated by a rotating shaft 6, called the low-pressure shaft, to which the fan 2 and the low-pressure compressor 3 are integrally connected, by means of a rotor trunnion 60, the low-pressure shaft 6 being also connected to a low-pressure turbine 7, downstream of the turbomachine, and extending along the turbomachine longitudinal axis X-X.

Figure 2:
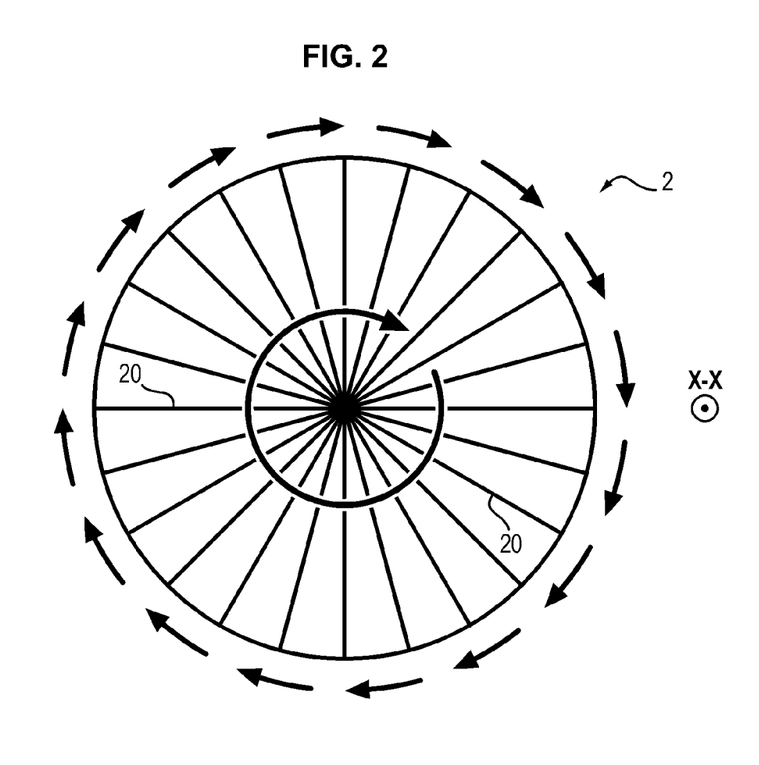
FIG. 2 is a front view of a rotor module subjected to tangential vibrations of which the mode has zero dephasing.

In operation, the fan 2 aspires air of which all or part is compressed by the low-pressure compressor 3. The compressed air then circulates in a high-pressure compressor (not shown) before being mixed with fuel, then ignited within the combustion chamber (not shown), to finally be successively expanded in the high-pressure turbine (not shown), and the low-pressure turbine 7. The opposite forces of compression, upstream and of expansion downstream cause aeroelastic flutter phenomena, which couple the aerodynamic forces on the blades 20, 30 and the flexural and torsional vibration movements in the blades 20, 30. As illustrated in FIG. 2, this flutter causes in particular intense torsional forces within the low-pressure shaft 6 which are fed through to the fan 2 and to the low-pressure compressor 3. The blades 20, 30 are then subjected to tangential pulses, particularly according to a vibration mode with zero dephasing. This is in fact a flexural mode with zero inter-blade 20, 30 dephasing, involving a non-zero moment on the low-pressure shaft 6, of which the natural frequency is approximately one and a half times greater than that of the first vibration harmonic, and of which the deformation has a nodal line at the half-height of the blade 20, 30. Such vibrations limit the mechanical performance of the fan 2 and of the low-pressure compressor 3, accelerate the wear of the turbomachine and reduce its lifetime.

Figure 3B:
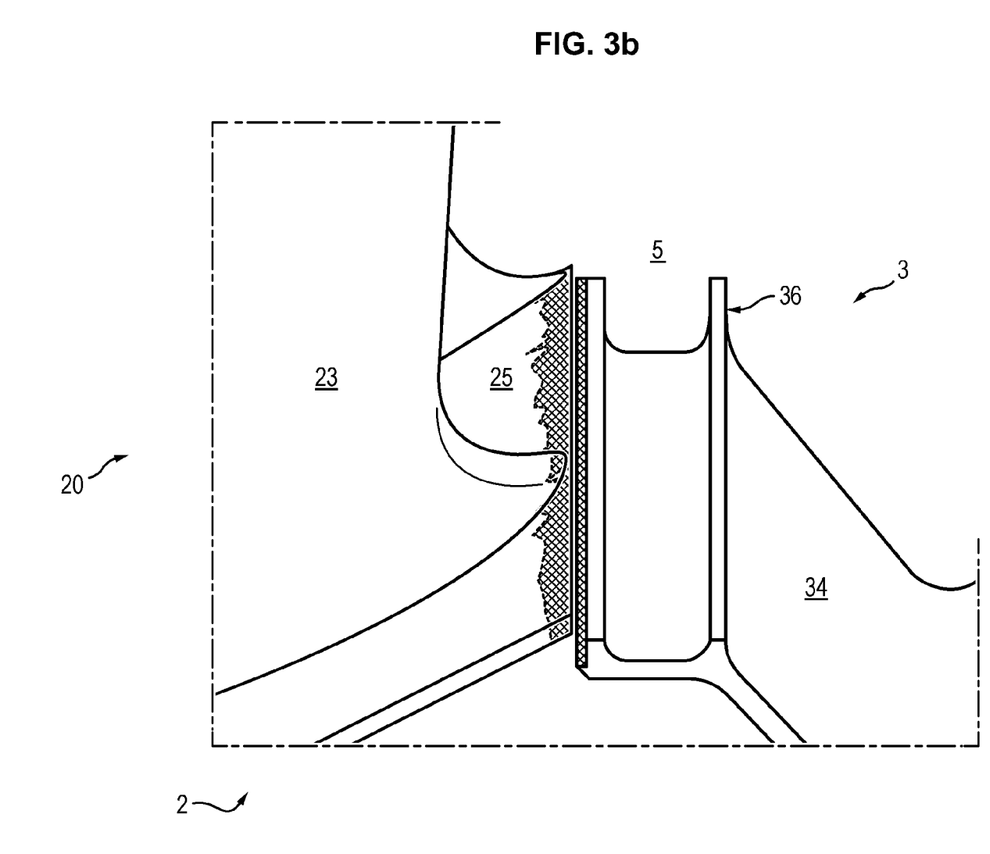
FIG. 3b is an enlargement in schematic perspective of the interface between two turbomachine rotor modules illustrating its tangential movements relative to said rotor modules.

As can be seen in FIG. 3*a*, the tangential movement by flutter of the fan 2 blade 20 is different from that of the ferrule 32 of the low-pressure compressor 3. Indeed, the length of the blade 20 of the fan 3 being greater than that of the low-pressure compressor 3 blade 30, the tangential flexural moment caused by the pulses of a fan 2 blade 20 is much greater than that caused by the pulses of a low-pressure compressor 3 blade 30. In addition, the stiffness of mounting within the fan 2 is different from that of mounting within the compressor 3. With reference to FIG. 3*b*, this deviation in tangential pulses is particularly visible at the interface between the platform 25 of a fan 2 blade 20, and the ferrule 32 knife edge seals 36.

Figure 5B:
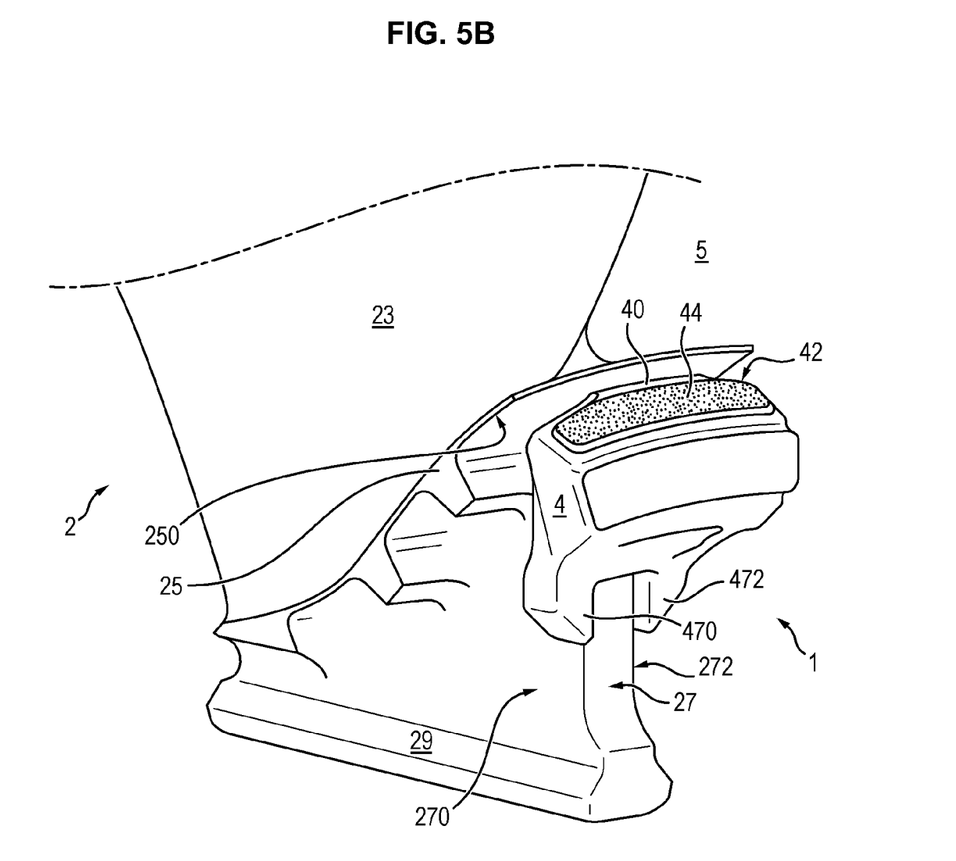
FIG. 5b illustrates schematically a fifth exemplary embodiment of a damping device according to the invention.

In a first embodiment illustrated in FIGS. 1, 5*a* and 5*b*, the damping device 4 is accommodated under the platform 25 of a blade 20, between the support 27 and the ferrule 32 of the low-pressure compressor 3. All or a part of the fan 2 blades 20 can be equipped with such a damping device 4, depending on the damping desired, but also the acceptable characteristic maintenance periods.

The first radial external surface 41 is supported with friction against the fan 2 at the internal surface 250 of the platform 25 of the fan 2 blade 20, and the second radial external surface 42 is supported with friction against the circumferential extension 34 of the ferrule 32. This ensures tangential coupling with high stiffness between the fan 2 and the low-pressure compressor 3, so as to reduce the tangential vibrations previously described. The coupling is in fact the greater as the zone in which the damping device 4 is disposed has the higher relative tangential movements for the zero-dephasing mode considered, as illustrated in FIGS. 3*a* and 3*b*. Typically, these relative displacements are on the order of a few millimeters. Furthermore, the damping device 4 also advantageously retains effectiveness on vibrational mode of the fan 2 blades 20 with non-zero dephasing.

In a second embodiment, still with reference to FIG. 1, the assembly 1 comprises an attachment tab 8 connected, on the one hand, to the damping device 4, and on the other hand to the connection between the fan 2 and the low-pressure compressor 3, so as to provide anti-rotation, as well as the axial and radial retention of the damping device 4. Considering the mechanical forces already described, it is indeed necessary to ensure stability, particularly axial and radial, of the damping device 4 within the assembly 1 during operation.

Advantageously, the attachment tab 8 is attached between the fan 2 and the low-pressure compressor 3 at the bolted connection 22 between the disk 21 and the ferrule 32.

The attachment tab 8 can also be interleaved between two circumferentially adjacent damping devices 4, and attached to the latter, for example by screwing. Alternatively, the attachment tab 8 can be attached to the damping devices 4 by any other means of attachment known to a person skilled in the art.

The assembly 1 can also comprise two attachment tabs 8, attached on either side of the damping device 4, for example by screwing. Alternatively, the attachment tabs 8 can be attached to the damping devices 4 by any other means of attachment known to a person skilled in the art.

The attachment tab 8 possibly proving to be too flexible tangentially, the assembly 1 can also comprise a second sacrificial plate 80 housed at the external surface 81 of the attachment tab 8, the second plate 80 being configured to increase the tangential stiffness of the damping device 4. The second sacrificial plate 80 also has the same features as the first sacrificial plate 40, particularly as regards composition, lubrication and additional coatings.

In a third embodiment illustrated in FIGS. 4a to 4c, 5a and 5b, the damping device 4 comprises a first sacrificial plate 40 housed at the first 41 and the second 42 supporting surface. This first plate 40 is configured to guarantee the support of the radial external surfaces 41, 42, of the damping device 4 on the fan 2, and the low-pressure compressor 3. Indeed, the mechanical forces during operation are such that slight tangential, axial and radial movements of the damping device 4 should be expected. These movements are in particular due to the tangential pulses to be damped, but also the centrifugal loading of the assembly 1. It is necessary that these movements do not cause wear on the blades 20 or the ferrule 32, of which the coatings are relatively fragile. In this regard, the first sacrificial plate 40 comprises an anti-wear material, for example of the Teflon type, a metal such as titanium, or any specific composite material known to the man skilled in the art. In addition, the first sacrificial plate 40 can be treated by dry lubrication, for the purpose of maintaining the value of the friction coefficient between the damping device 4 and the ferrule 32 and/or the blade 2 platform 25. This material with lubrication properties is for example of the MoS2 type. Advantageously, as is visible in FIGS. 4a to 4c, 5a and 5c, the first sacrificial plate 40 has a "V" shape.

Figure 4A:
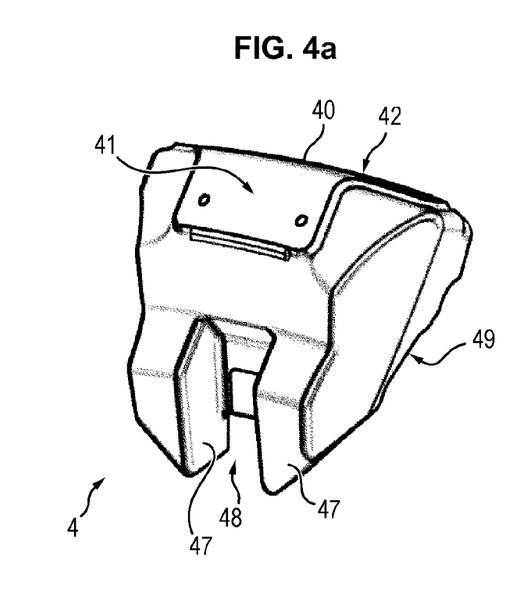
FIG. 4a illustrates schematically a first exemplary embodiment of a damping device according to the invention.
Figure 4B:
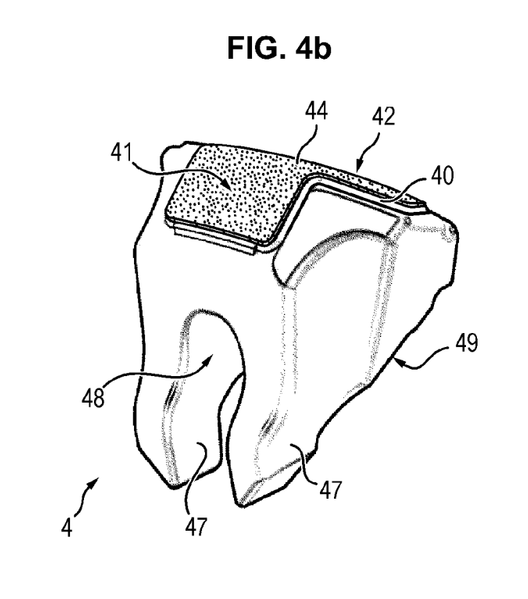
FIG. 4b illustrates schematically a second exemplary embodiment of a damping device according to the invention.

For the purpose of improving the support of the damping device 4, the first sacrificial plate 40 can also comprise an additional coating 44, as can be seen in FIGS. 4b, 5a and 5b. Generally, such a coating 44 is configured to reduce the friction and/or the wear of the engine parts between the first plate 40 and the rotor modules 2, 3.

This coating 44 is for example of the viscoelastic type. Such a coating 44 then advantageously comprises a material having properties similar to those of a material such as the range having the commercial designation "SMACTANE®," for example a material of the "SMACTANE® 70" type. Another means of increasing the tangential stiffness of the assembly 1 is to sufficiently preload the viscoelastic coating 44, so that the relative tangential movement between the blade 20 and the ferrule 32 is transformed into viscoelastic shear of the coating 44 alone.

Alternatively, this coating 44 is of the dissipative and/or viscoelastic and/or damping type. The dissipative coating 44 then comprises a material chosen from those having mechanical properties similar to those of Vespel, of Teflon or of any other material with lubricating properties. More generally, the material has a coefficient of friction comprised between 0.3 and 0.07. Too high a flexibility would not allow the damping of the mode with zero dephasing, because the relative movements of the fan 2 and of the low-pressure compressor 3 would lead to friction and/or oscillations between a "stuck" state and a "slipping" state of the damping device 4. These additional coatings 44 are applied by gluing to the first sacrificial plate 40.

Figure 4C:
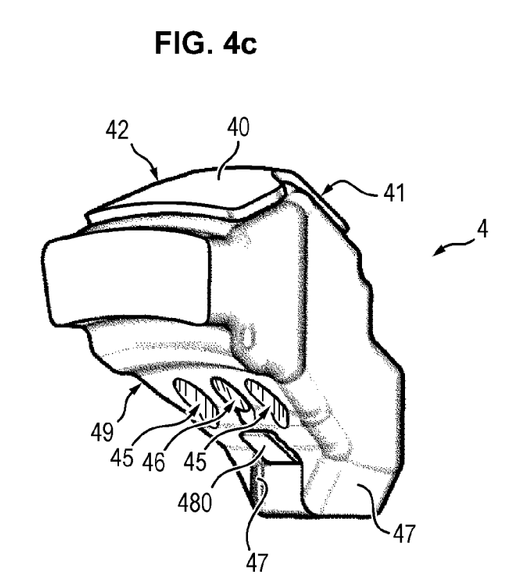
FIG. 4c illustrates schematically a third exemplary embodiment of a damping device according to the invention.

In a fourth embodiment illustrated in FIG. 4c, damping by tangential coupling can be adjusted by controlling the mass of the damping device 4, which influences inertia in shear. This control involves modifications of the mass of the damping device 4. This mass can be modified in all or a part of the damping device 4, typically by making bores 45 to lighten it, and/or adding one or more inserts 46, metallic for example, to weigh it down.

Advantageously, the combination of the second and the third embodiment allows adjusting the contact forces between the damping device 4 and the fan 2 and the low-pressure compressor 3. Indeed, contact forces that are too high between the fan 2 blade 20 and the damping device 4 would limit the dissipation of vibrations during operation.

In a fifth embodiment illustrated in FIGS. 4a to 4c, 5a and 5b, the damping device 4 comprises two shoulders 47 on either side of a notch 48 provided on the internal surface 49 of the damping device 4, the shoulders 47 being supported against the ferrule 32 or, where appropriate, against the support 27, as is visible in FIG. 5a. Advantageously, as is visible more precisely in FIG. 5b, the shoulders 470, 472 are supported against the support 27 and also extend on either side of the support 27 in a circumferential direction, downstream of the support 27. In other words, in this case, a first shoulder 470 extends along a first side 270 of the support 27, downstream of the support 27, and a second shoulder 472 extends along a second side 272 of the support 27, opposite to the first side 270 of the support 27 in a circumferential direction, also downstream of the support 27. The internal support of the damping device 4 on the ferrule 32 guarantees, among other things, radial stability. The internal support of the damping device 4 on the support 27 guarantees, among other things, circumferential stability. Moreover, the elasticity of the first shoulder 470 and of the second shoulder 472 also participates in the pre-retention of the damping device 4 during assembly and/or operation. In this regard, it is possible to provide that the first shoulder 470 and the second shoulder 472 comprise polyurethane, which allows deformation of said shoulders 470, 472 during assembly and/or operation.

In complement to the second embodiment, the attachment tab 8 can then be connected to the damping device 4 at the notch 48 separating the two shoulders 47. In this case, as is visible in FIG. 4c, the notch 48 can comprise a third sacrificial plate 480 on which the attachment plate 8 is supported, providing functions equivalent to those of the first sacrificial plate 40, and having the same features, particularly as regards composition, lubrication and additional coatings.

Different embodiments of the assembly 1 according to the invention have been described in the case where the first rotor module 2 is a fan, and the second rotor module 3 is a low-pressure compressor.

This, however, is not limiting, because the first rotor module 2 can also be a first, high- or low-pressure, compressor stage, and the second rotor module 3 a second stage of said compressor, successive to the first compressor stage, upstream or downstream of the latter. Alternatively, the first rotor module 2 is a first, high- or low-pressure, turbine stage and the second rotor module 3 a second stage of said turbine, successive to the first turbine stage, upstream or downstream of the latter.

The invention claimed is:

1. A turbomachine assembly comprising:
  a first rotor module comprising a first blade, the first blade having a first length;

a second rotor module connected to the first rotor module, the first rotor module comprising a second blade, the second blade having a second length, the second length being smaller than the first length, and a ferrule; and a damping device comprising a first radial external surface supported with friction against the first rotor module and a second radial external surface supported with friction against the second rotor module, so as to couple the first rotor module with the second rotor module for the purpose of damping vibrational movements of the first rotor module relative to the second rotor module during operation, the damping device further comprising two shoulders on either side of a notch provided at an internal surface of the damping device, wherein the two shoulders are supported against the ferrule.

2. The assembly according to claim 1, wherein:
the first rotor module comprises a disk centered on a turbomachine longitudinal axis;
the first blade is mounted on an external periphery of the disk, the first blade thus extending from the external periphery of the disk, the first blade further comprising an airfoil, a platform, a support and a root, the root being embedded in a recess of the disk;
the ferrule comprises a circumferential extension extending toward the platform;
the first radial external surface is supported with friction on an internal surface of the platform, the second radial external surface being supported with friction against the circumferential extension.

3. The assembly according to claim 1, wherein the damping device comprises a first sacrificial plate housed at both the first radial external surface and the second radial external surface, the first plate being configured to guarantee a support of both the first radial external surface and the second radial external surface.

4. The assembly according to claim 3, wherein the first sacrificial plate comprises a coating configured to reduce friction between the first sacrificial plate and both the first rotor module and the second rotor module.

5. The assembly according to claim 3, wherein the first sacrificial plate comprises a coating of the viscoelastic type.

6. The assembly according to claim 1, wherein the damping device comprises bores configured to lighten a mass of the damping device.

7. The assembly according to claim 1, wherein the damping device comprises inserts configured to add weight to the damping device.

8. The assembly according to claim 2, wherein the two shoulders are supported against the support.

9. The assembly according to claim 2, wherein the two shoulders are supported against the support and further extend on either side of the support in a circumferential direction.

10. The assembly according to claim 1, further comprising an attachment tab connected to the damping device and to a connection between the first rotor module and the second rotor module, so as to provide anti-rotation, as well as axial and radial retention of the damping device.

11. The assembly according to claim 10, wherein the attachment tab comprises a second sacrificial plate housed at an external surface of the attachment tab, the second sacrificial plate being configured to increase a tangential stiffness of the damping device.

12. The assembly according to claim 10, wherein the attachment tab is connected to the notch.

13. The assembly according to claim 12, wherein the notch comprises a third sacrificial plate on which the attachment tab is supported.

14. The assembly according to claim 1, wherein the first rotor module is a fan and the second rotor module is a low-pressure compressor.

15. A turbomachine comprising the assembly according to claim 1.

16. A turbomachine assembly comprising:
a first rotor module comprising a disk centered on a turbomachine longitudinal axis and a first blade, the first blade having a first length and being on an external periphery of the disk, the first blade thus extending from the external periphery of the disk, the first blade further comprising an airfoil, a platform, a support and a root, the root being embedded in a recess of the disk;
a second rotor module connected to the first rotor module, the first rotor module comprising a second blade, the second blade having a second length, the second length being smaller than the first length, and a ferrule; and
a damping device comprising a first radial external surface supported with friction against the first rotor module and a second radial external surface supported with friction against the second rotor module, so as to couple the first rotor module with the second rotor module for the purpose of damping vibrational movements of the first rotor module relative to the second rotor module during operation, the damping device further comprising two shoulders on either side of a notch provided at an internal surface of the damping device, wherein the two shoulders are supported against the support.

17. A turbomachine assembly comprising:
a first rotor module comprising a disk centered on a turbomachine longitudinal axis and a first blade, the first blade having a first length and being on an external periphery of the disk, the first blade thus extending from the external periphery of the disk, the first blade further comprising an airfoil, a platform, a support and a root, the root being embedded in a recess of the disk;
a second rotor module connected to the first rotor module, the first rotor module comprising a second blade, the second blade having a second length, the second length being smaller than the first length, and a ferrule; and
a damping device comprising a first radial external surface supported with friction against the first rotor module and a second radial external surface supported with friction against the second rotor module, so as to couple the first rotor module with the second rotor module for the purpose of damping vibrational movements of the first rotor module relative to the second rotor module during operation, the damping device further comprising two shoulders on either side of a notch provided at an internal surface of the damping device, wherein the two shoulders are supported against the support and further extend on either side of the support in a circumferential direction.

18. A turbomachine assembly comprising:
a first rotor module comprising a first blade, the first blade having a first length;
a second rotor module connected to the first rotor module, the first rotor module comprising a second blade, the second blade having a second length, the second length being smaller than the first length, and a ferrule;
a damping device comprising a first radial external surface supported with friction against the first rotor module and a second radial external surface supported with friction against the second rotor module, so as to couple the first rotor module with the second rotor module for the purpose of damping vibrational movements of the first rotor module relative to the second rotor module during operation, the damping device further comprising two shoulders on either side of a notch provided at an internal surface of the damping device;

an attachment tab connected to the damping device and to a connection between the first rotor module and the second rotor module, so as to provide anti-rotation, as well as axial and radial retention of the damping device.

\* \* \* \* \*